Nov. 19, 1940.  I. G. DOTY  2,222,142
BARREL TRUCK
Filed May 28, 1940
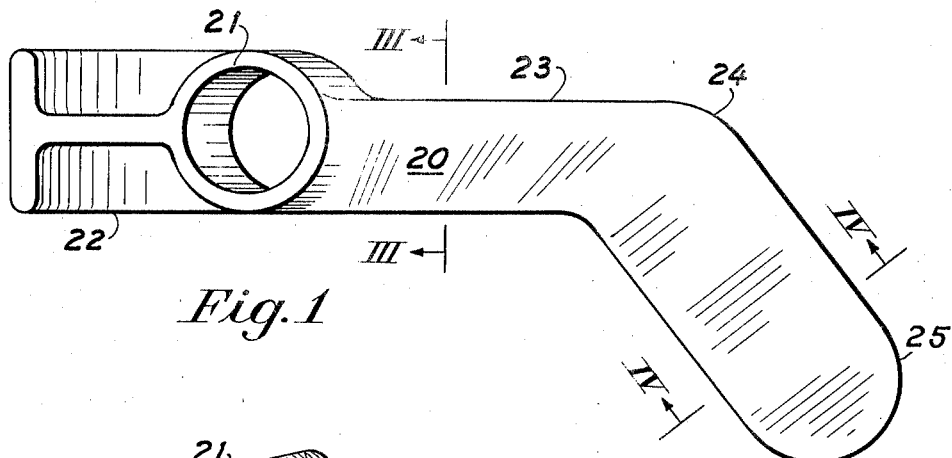
Fig. 1
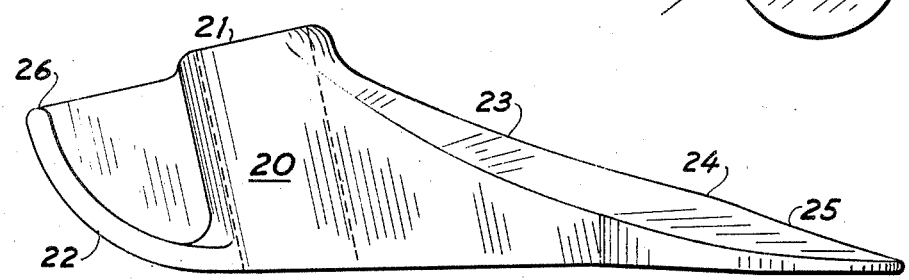
Fig. 2
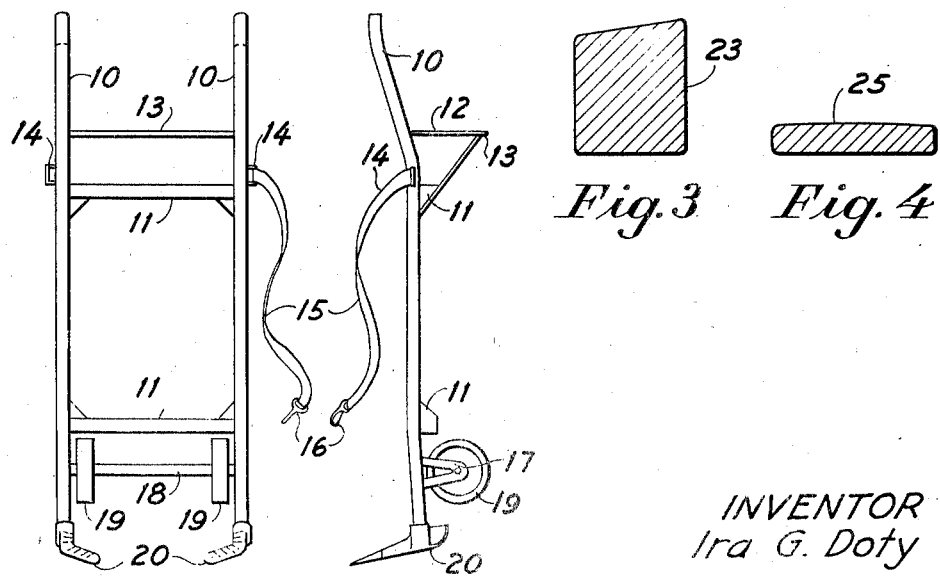
Fig. 3  Fig. 4
Fig. 5  Fig. 6
INVENTOR
Ira G. Doty
By *[signature]*
ATTORNEY Patented Nov. 19, 1940

2,222,142

UNITED STATES PATENT OFFICE 2,222,142

BARREL TRUCK

Ira G. Doty, Berkeley, Calif., assignor to Standard Oil Company of California, San Francisco, Calif., a corporation of Delaware Application May 28, 1940, Serial No. 337,611

6 Claims. (Cl. 280—56)

This invention relates to hand trucks and particularly to one which is designed for picking up and carrying steel barrels, drums, and other cylindrical objects such as bottles of liquefied gas and the like.

Heretofore hand trucks or barrel trucks of this type have been provided with a forwardly extending wedge-shaped member at the lower end of the trucks, this member being adapted to be forced beneath the rim of a barrel to lift the same and permit it to be carried by tipping the truck backwardly so that its weight was carried upon one or more pairs of wheels or rollers. Most of the commoner types of trucks used a single wedge-shaped member which extended across the entire front face of the truck. Attempts have been made to use a pair of tapered wedges or toes, each one extending directly forwardly from the two side members of the truck body. All of these arrangements required that the barrel be tipped forwardly, away from the operator so that the wedge or wedges could be inserted below the raised rear rim of the barrel. Such an operation was not only hazardous to the operator as it required that he reach forward and push upon a barrel so as to raise its rear edge, but also required that he hold the barrel in that position and then force the wedge or wedges of the truck below the raised rim.

This invention comprehends broadly a particular arrangement of bent, tapered, and sloped wedges or toes adapted to be used at the lower end of the frame of a barrel truck and designed to lift as well as safely carry a barrel with much less effort on the part of the operator and with greater safety to him.

It is an object of this invention to provide an improved arrangement and design of a wedge or toe for a barrel truck.

Another object is to provide a device of this nature which includes a fulcrum rocker so that the center of support of the barrel and truck is variable as the truck is tipped backwardly to lift the barrel.

Another object is to provide a unitary construction of a sloped wedge-shaped toe for a barrel truck that may be attached to the usual tubular side members of a truck with a minimum of alteration to the latter.

These and other objects and advantages will be further apparent from the following description and from the accompanying drawing, which illustrates a preferred embodiment of this device as applied to a truck for handling barrels.

In the drawing,

Figure 1 is a top plan view of a barrel truck toe embodying this invention.

Figure 2 is a side elevational view of the toe shown in Figure 1.

Figure 3 is a vertical sectional view on line III—III of Figure 1.

Figure 4 is a vertical sectional view on line IV—IV of Figure 1.

Figure 5 is a front elevational view of one type of barrel truck to which this invention is adapted.

Figure 6 is a side elevational view of the barrel truck of Figure 4 showing a pair of the improved toes in place thereon.

Referring to Figures 5 and 6, which show an assembled truck, reference numeral 10 designates two tubular members which form the frame of the truck and also the handles by means of which it is moved. Cross members 11 serve to connect side members 10 and may be concave in order to receive the rounded body of a barrel or the like. A pair of brackets 12 may be provided extending backwardly from side members 10 and connected by a crossbar 13 to support the truck in a substantially horizontal position with the handles clear of the floor. Side members 10 are preferably fitted with loops 14 for a strap or other flexible member 15 having a snap 16 to secure a barrel or the like to the body of the truck while the barrel is being lifted and moved. Near the lower end of members 10 are rearwardly extending brackets 17 adapted to support a shaft 18 for wheels 19.

Referring now to Figures 1 and 2 which illustrate the improved arrangement of toes 20 for the lower end of tubular members 10, it will be noted that each of these comprises a generally upright socket or connecting means 21 at the rear of which is a rounded fulcrum rocker 22. From the forward side of socket 21 extends an upright, forwardly and transversely tapering barrel carrying portion or sector 23 which is bent obliquely at 24 to terminate in a thinner wedge-shaped lifting portion 25, the latter desirably extending toward the center of the barrel or other cylindrical object to be transported and desirably terminating a short distance below the plane of the bottom of sector 23, as shown in Figure 2. As a pair of right- and left-hand toes 20 are installed on the truck frame 10, the carrying sectors 23 are preferably substantially parallel and the lifting portions or wedges 25 converge toward the center of the barrel. Figures 3 and 4 illustrate the inwardly sloping upper surfaces of sections 23 and 25 when they are installed as just explained. These surfaces may be flat or parallel with the plane of the bottom of the sectors, but if sloped, accomplish a desirable function in the operation of this improved arrangement as they tend to center the barrel as it is lifted and reduce wear on the barrel and on the sections themselves. The arrangement just described facilitates the entrance of wedges 25 beneath the rim of the barrel without requiring that the latter be tipped forwardly away from the operator, as has heretofore been necessary.

In operation, the ends of toes 20 of the truck are placed against the rim of the barrel at somewhat widely spaced points thereon, the position of the truck being as illustrated in Figure 6, that is, with side members substantially vertical. The converging wedge portions 25 of toes 20 encircle the lower circular rim of the barrel so that as they are lifted and the barrel is tipped backwardly toward the operator by strap 15, on that portion of its rim between the toes 20 and between a line connecting the extremities of the toes and a parallel line connecting the two points of contact of the toes or rockers with the floor or supporting surface, the ends of the toes will automatically pass beneath the barrel rim. As the operator continues to pull the truck frame 10 backwardly, the barrel rim will slide backwardly toward the thicker parts of members 23 and 25, and will eventually come to rest on some point on the sloping upper sides of sectors 23. The rearward motion of the handles of frame 10 will transfer the weight of the barrel to the rounded fulcrum rocker 22, and, as the movement continues, the fulcrum point will move backwardly so as to approach the upper end 26 of the rocker 22 where a part of the weight will be transferred to wheels 19. Desirably the dimensions of toes 20 are such that when fulcrum rocker 22 and wheels 19 are both in contact with a horizontal supporting surface, the center of gravity of the barrel will be above and somewhere between those two supporting points. This will insure that even though the barrel may not have moved upwardly along toes 20 as far as it will go, the barrel and truck will not tend to overbalance either forwardly or backwardly if the operator should release the handles of frame 10.

Desirably the toes 20 are made of a unitary construction such as a steel casting and it has been found by extensive tests and use that a means such as socket 21 is quite desirable for securing the toes to the lower ends of tubular members 10. It is obvious, however, that other forms of securing means connecting the toes and the side frame of the truck, and other methods of fabrication such as welding or forging could be employed without departing from the invention. Accordingly, all such modifications and changes that come within the scope of the appended claims are embraced thereby.

I claim:

1. A pair of right- and left-hand toes for a barrel handling truck or the like, each comprising means for forming a generally upright connection to the frame of said truck, a rounded fulcrum rocker extending rearwardly from said connection means, a forwardly tapering barrel carrying portion extending forwardly from said connection means and terminating at its forward end in an angularly disposed relatively thin barrel lifting portion, so constructed and arranged that, when a pair of said toes are assembled to a truck, said barrel carrying portions are substantially parallel and said barrel lifting portions converge toward the center of the barrel to be handled.

2. A pair of right- and left-hand toes for a barrel handling truck or the like, according to claim 1, in which said connection means comprises a socket for said frame.

3. A pair of right- and left-hand toes for a barrel handling truck or the like, according to claim 1, in which said connection means comprises a rearwardly inclined socket for said frame.

4. A pair of right- and left-hand toes for a barrel handling truck or the like, according to claim 1, in which the upper surfaces of said barrel carrying and said barrel lifting portions slope inwardly toward the center line of said truck.

5. A unitary toe and fulcrum for a barrel truck or the like comprising means for forming a generally upright connection to the frame of said truck, a rounded rocker extending rearwardly from said connection means, a tapered sector extending forwardly from said connection means, and a thin wedge extending at an oblique angle from the said tapered sector toward the center of the barrel to be handled, so constructed and arranged that said wedge will pass beneath the rim of a barrel when the latter is tipped backwardly.

6. A toe for a barrel truck according to claim 1, in which the wedge extends downwardly a short distance below the plane of the bottom of said tapered sector.

IRA G. DOTY.